United States Patent
Yang et al.

(10) Patent No.: US 8,827,522 B2
(45) Date of Patent: Sep. 9, 2014

(54) MOISTURE GENERATION PREVENTING STRUCTURE OF VEHICLE HEAD LAMP

(71) Applicants: Hyundai Motor Company, Seoul (KR); Hyundai Mobis Co., Ltd., Seoul (KR)

(72) Inventors: Jeong Gyu Yang, Whasung-Si (KR); Byung Ook Park, Whasung-Si (KR); Sae Jun Park, Whasung-Si (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 100 days.

(21) Appl. No.: 13/706,223

(22) Filed: Dec. 5, 2012

(65) Prior Publication Data

US 2014/0043844 A1 Feb. 13, 2014

(30) Foreign Application Priority Data

Aug. 9, 2012 (KR) .................... 10-2012-0087308

(51) Int. Cl.
*B60Q 1/04* (2006.01)
*F21S 8/10* (2006.01)
(52) U.S. Cl.
CPC . *B60Q 1/04* (2013.01); *F21S 48/33* (2013.01); *F21S 48/335* (2013.01)
USPC ........................................................ 362/547
(58) Field of Classification Search
CPC ........... B60Q 1/04; F21S 48/33; F21S 48/335
USPC ........................................................ 362/547
See application file for complete search history.

(56) References Cited

U.S. PATENT DOCUMENTS

| 3,725,698 | A | * | 4/1973 | Craig | 362/548 |
| 5,980,074 | A | * | 11/1999 | Hwang | 362/547 |
| 6,452,217 | B1 | | 9/2002 | Wojnarowski et al. | |
| 6,883,948 | B2 | * | 4/2005 | VanDuyn et al. | 362/547 |
| 8,465,186 | B2 | * | 6/2013 | Michalak et al. | 362/520 |
| 2005/0105300 | A1 | * | 5/2005 | Pajer et al. | 362/516 |
| 2005/0276053 | A1 | | 12/2005 | Nortrup et al. | |
| 2006/0013014 | A1 | | 1/2006 | Hayman et al. | |
| 2013/0070470 | A1 | | 3/2013 | Yang | |

FOREIGN PATENT DOCUMENTS

| JP | 2008-504907 A | 2/2008 |
| KR | 10-2006-0108757 A | 10/2006 |
| KR | 100934501 B1 | 12/2009 |
| KR | 20110015300 A | 2/2011 |
| KR | 10-2013-0031114 A | 3/2013 |

* cited by examiner

*Primary Examiner* — Stephen F Husar
*Assistant Examiner* — James Cranson, Jr.
(74) *Attorney, Agent, or Firm* — Morgan, Lewis & Bockius LLP

(57) ABSTRACT

A moisture generation preventing apparatus of a vehicle head lamp, may include a phase change material (PCM) unit mounted in a housing of the vehicle head lamp having a lens mounted at a front end portion of the housing to prevent moisture from being generated in the lens when an internal temperature of the head lamp drops below a predetermined degree, wherein the PCM unit sprays gaseous phase change material (PCM) to an inner portion of the head lamp.

8 Claims, 5 Drawing Sheets

MOISTURE GENERATION PREVENTING STRUCTURE OF VEHICLE HEAD LAMP

CROSS-REFERENCE TO RELATED APPLICATION

The present application claims priority to Korean Patent Application No. 10-2012-0087308, filed on Aug. 9, 2012 in the Korean Intellectual Property Office, the entire contents of which is incorporated herein for all purposes by this reference.

BACKGROUND OF THE INVENTION

1. Field of the invention

The present invention relates to a moisture generation preventing structure of a vehicle head lamp, and more particularly, to a moisture generation preventing structure of a vehicle head lamp for preventing a phenomenon in which moisture is generated at inner sides of lenses for head lamps installed in head lamp housings of left and right sides of the front of a vehicle.

2. Description of Related Art

Generally, head lamps of a vehicle are mounted at left and right sides of the front of a vehicle body to irradiate light toward the front of the vehicle, thereby allowing a driver to drive the vehicle on a dark road at night or allowing the driver to secure a visual field of the front of the vehicle during rainy weather, in order for the driver to safely drive the vehicle at night.

FIG. 1 is a view showing a vehicle head lamp according to the related art.

It is preferable that the vehicle head lamp 2 according to the related art installed in a vehicle as shown in FIG. 1 is maintained in a clean state in which moisture, or the like, is not condensed on a head lamp lens cover in order to secure a good visual field. However, the moisture is generated at an inner side of a head lamp lens due to a temperature difference between inner and outer portions of the head lamp 2.

According to the related art, various methods have been conducted in order to remove the moisture generated at the inner side of the head lamp lens. For example, a method of removing moisture through a vent formed in a head lamp housing, a method of removing moisture through a moisture absorbent provided in a head lamp housing, and a method of performing hydrophilic coating on a head lamp lens to allow moisture not to be viewed with eyes even though the moisture is generated in head lamp lens have been conducted.

However, in the vehicle head lamp according to the related art, since only heat generated in an electric bulb is an energy source moving internal air of the head lamp housing in which the head lamp is installed to evaporate the moisture by heat transfer by convection and the movement of the internal air is made only by natural convection, a separate device capable of forcibly moving the internal air is required. In addition, in the case in which external air is introduced in the head lamp, foreign materials such as dust are introduced thereinto to deteriorate irradiation capability of the head lamp, in the case in which the moisture absorbent is used, a moisture removing function is lost at the time of saturation of the moisture absorbent, and in the case in which the hydrophilic coating is applied to the head lamp lens, a cost increases due to a high hydrophilic coating cost and hydrophilic capability is lost at the time of generation of excessive moisture.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a moisture generation preventing structure of a vehicle head lamp for preventing a phenomenon in which moisture is generated at inner sides of lenses for head lamps installed in head lamp housings of left and right sides of the front of a vehicle.

In an aspect of the present invention, a moisture generation preventing apparatus of a vehicle head lamp, may include a phase change material (PCM) unit mounted in a housing of the vehicle head lamp having a lens mounted at a front end portion of the housing to prevent moisture from being generated in the lens when an internal temperature of the head lamp drops below a predetermined degree, wherein the PCM unit sprays gaseous phase change material (PCM) to an inner portion of the head lamp.

The PCM unit may include a case including the PCM therein, and a valve unit selectively discharging the PCM from an inner portion of the case to the inner portion of the head lamp.

The case may include a storing space having the PCM stored therein, an insertion groove, wherein the valve unit is mounted in the insertion groove, and a through-hole fluid-connected to the storing space.

The valve unit may include a plate positioned on an upper surface of the through-hole in the insertion groove, an elastic member positioned on an upper surface of the plate and elastically biasing the plate toward the through-hole, and an engaging member positioned at an upper portion of the elastic member and engaged to the insertion groove of the case.

The engaging member may include a nozzle, the nozzle being selectively fluid-communicated to the through-hole in accordance with a movement of the plate.

The engaging member is a headless bolt.

The valve unit may further include a sponge positioned at an upper portion of the through-hole.

A lower portion of the case is provided with a connector to fill the PCM in the storing space of the case therethrough.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
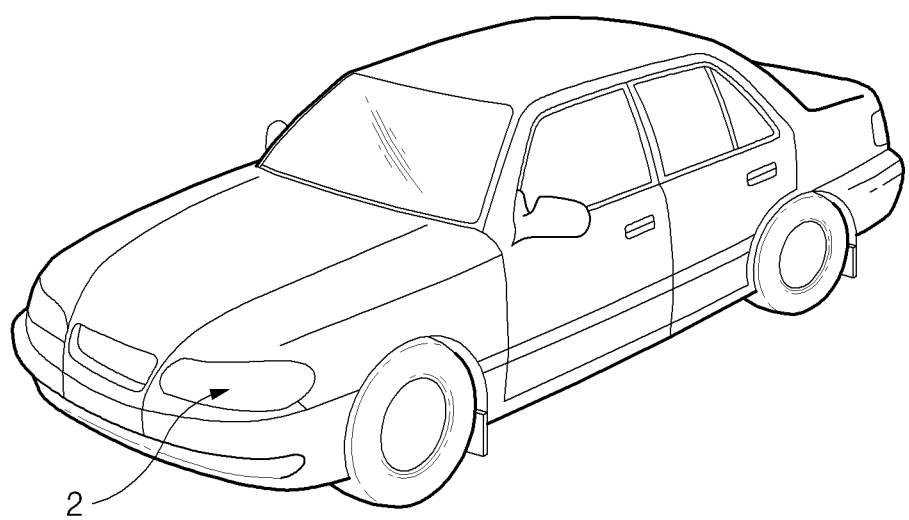
FIG. 1 is a view showing a vehicle head lamp according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings.

A moisture generation preventing structure of a vehicle head lamp according to an exemplary embodiment of the present invention basically includes a phase change material (PCM) unit 100 spraying refrigerant gas to a vehicle head lamp 2 to prevent moisture generation, as shown in FIGS. 2 to 5.

Figure 2:
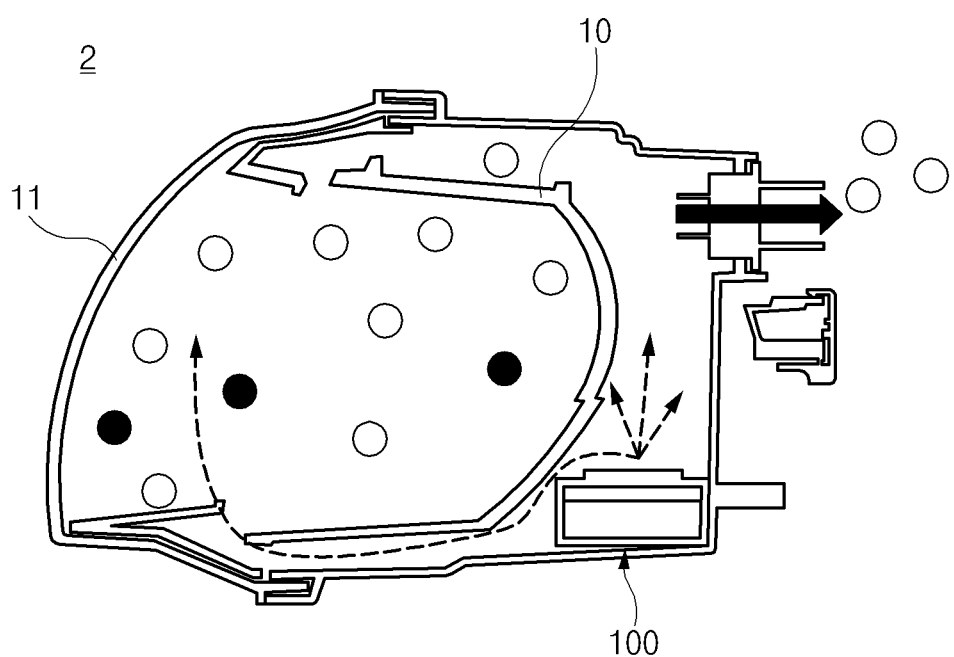
FIG. 2 is a cross-sectional view showing a moisture generation preventing structure of a vehicle head lamp according to an exemplary embodiment of the present invention.

As shown in FIG. 2, the PCM unit 100 is mounted in a housing 10 configuring the vehicle head lamp 2 and having a lens 11 mounted at a front end portion thereof to spray the refrigerant gas when an internal temperature of the head lamp 2 drops, thereby preventing moisture from being generated in the lens 11.

Figure 3:
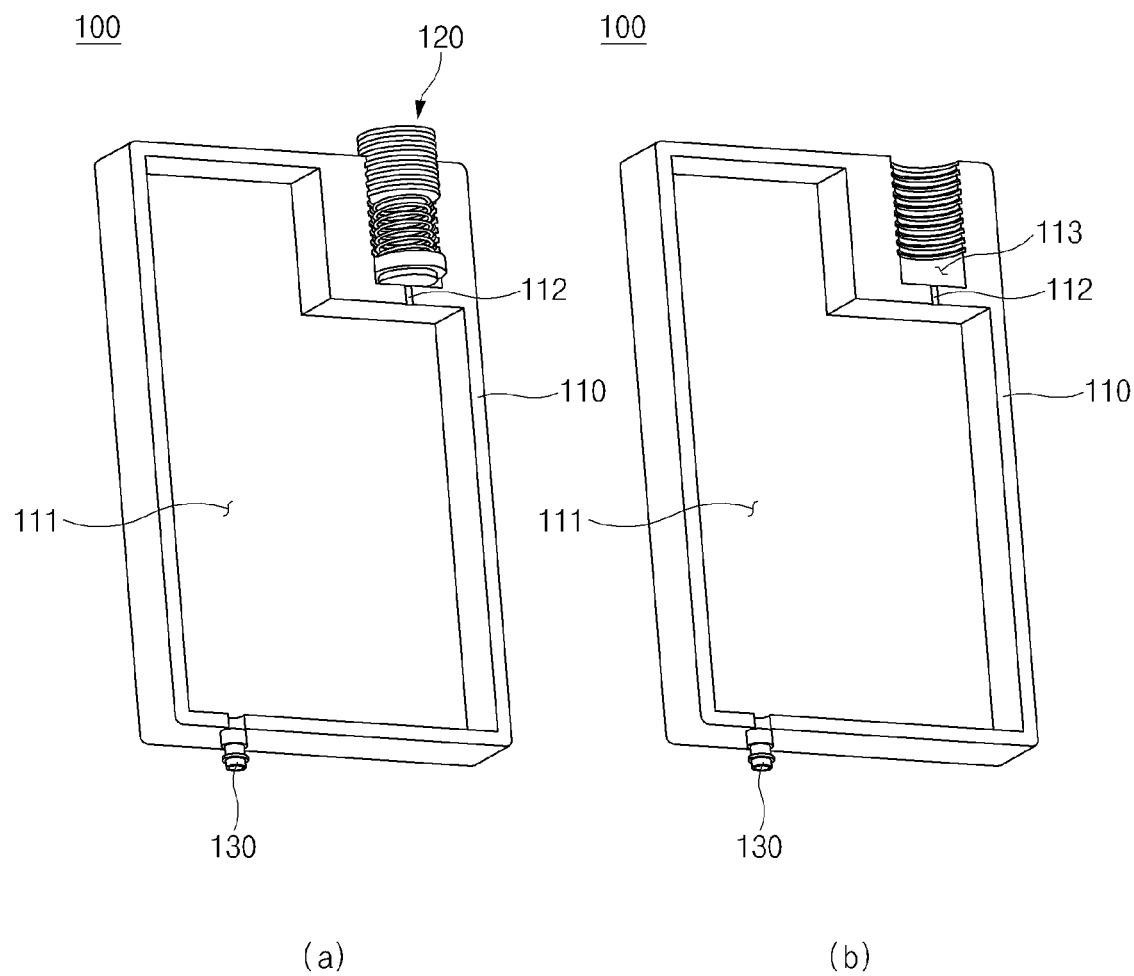
FIG. 3A is a view showing a state in which a valve is mounted in a case in the moisture generation preventing structure of the vehicle head lamp according to the exemplary embodiment of the present invention.
FIG. 3B is a view showing a state before the valve is mounted in the case in the moisture generation preventing structure of the vehicle head lamp according to the exemplary embodiment of the present invention.
Figure 4:
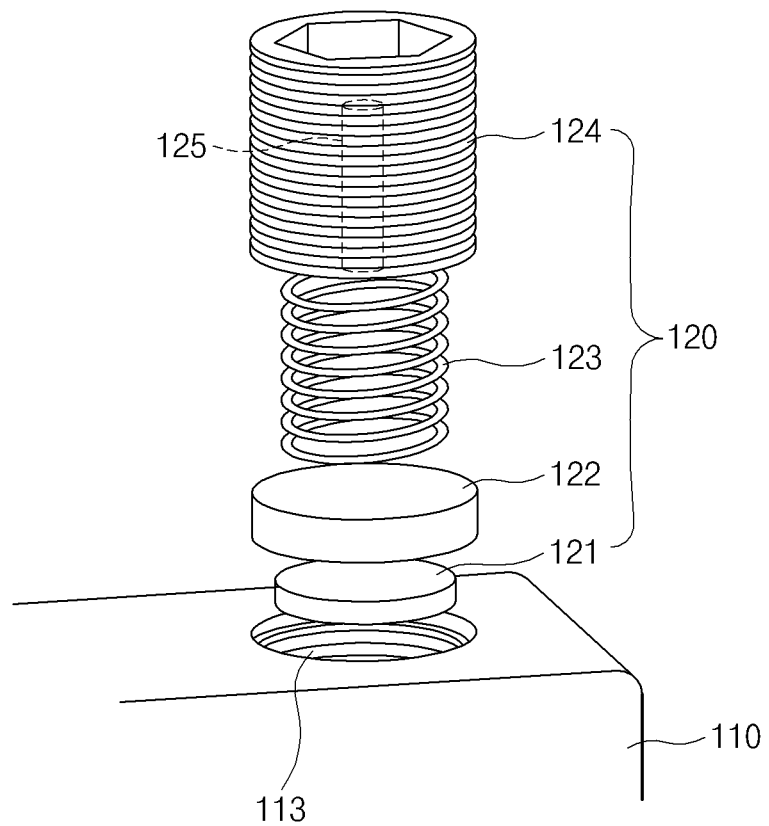
FIG. 4 is an exploded perspective view showing the valve in the moisture generation preventing structure of the vehicle head lamp according to the exemplary embodiment of the present invention.

As shown in FIGS. 3 and 4, the PCM unit 100 is configured to include a case 110 including a phase change material (PCM) provided at an inner portion thereof and a valve 120 discharging the PCM from the case 110 to the outside.

The PCM, which is a colorless and odorless and incombustible mixed refrigerant, is filled in the case 110, the case 110 may measure and control a temperature of the PCM, and the valve 120 mounted in the case 110 may maintain airtightness of the PCM and adjust a spray amount of PCM.

In addition, the case 110 is configured to include a storing space 111 having the PCM stored therein, an insertion groove 113 connected to the storing space 111 through a through-hole 112, and the valve 120 mounted in the insertion groove 113 and connected to the storing space 111 through the through-hole 112, wherein the PCM may be discharged from the insertion groove 113 through the storing space 111 and the through-hole 112 and the PCM discharged from the insertion groove 113 may be finally sprayed through the valve 120.

The valve 120 is configured to include a sponge 121 positioned at a lower surface of the insertion groove 113, a plate 122 positioned on an upper surface of the sponge 121, a spring 123 positioned on an upper surface of the plate 122, and a headless bolt 124 positioned at an upper portion of the spring 123.

Here, the sponge 121 may absorb the PCM discharged from the insertion groove 113 to allow the PCM to be discharged to the outside.

The plate 122 may be positioned beneath the spring 123 while being positioned on the upper surface of the sponge 121 to support the spring 123, the headless bolt 124 may be positioned on the spring 123 to tighten or loosen the insertion groove 113 of the case 110, thereby controlling pressure at which the PCM is sprayed.

Here, the headless bolt 124 may include a nozzle 125 so that the PCM may be discharged.

Meanwhile, it is preferable that a lower portion of the case 110 is provided with a connector 130 capable of filling the PCM in cooperation with the storing space 111.

Hereinafter, an operation and effect of the present invention will be described.

An exemplary embodiment of the present invention, which is to lower a dew point temperature at an inner portion of the head lamp 2 to reduce a temperature difference between inner and outer portions of the head lamp 2, thereby suppressing the generation of the moisture, discloses a technology in which the PCM unit for controlling the dew point 100 is mounted in the head lamp 2 to spray a low temperature refrigerant to the inner portion of the head lamp 2 under a lighting condition of the head lamp 2, thereby lowering the dew point temperature by 3 to 5° C. through reduction of partial pressure and a temperature in the head lamp 2.

Here, the PCM unit 100 may be mounted at the inner or outer portion of the head lamp 2 and gasify the PCM, which is a refrigerant for inducing a phase change from liquid to gas under the lighting condition of the head lamp 2, at a temperature of about 50° C., which a light temperature of the head lamp 2, to spray the gasified gas to the inner portion of the head lamp 2, wherein the sprayed gas is maintained in a gas state under 1 atmosphere condition in a range of a room temperature to −40° C. to maintain a partial lowering effect in the head lamp 2.

In an exemplary embodiment of the present invention, the case 110 is disposed near to the housing 10 of the vehicle head lamp 2. Under a lighting condition of the head lamp 2, the case 110 is heated to gasify the PCM in the case 110. When the pressure of the PCM overcomes the elastic force of the spring 123, the gaseous PCM is discharged to the inner space of the housing 10 through the through-hole 112 and the nozzle 125.

Figure 5:
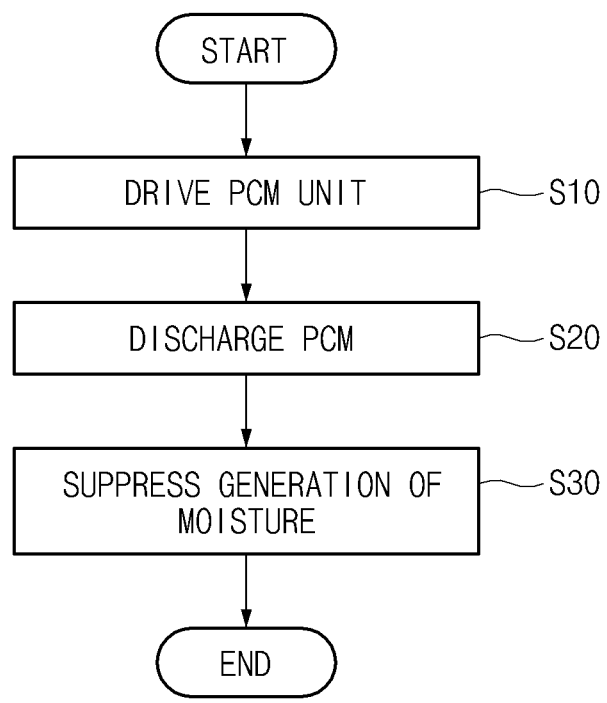
FIG. 5 is a flow chart showing a moisture generation controlling step in the moisture generation preventing structure of the vehicle head lamp according to the exemplary embodiment of the present invention.

Meanwhile, a moisture generation controlling step through the moisture generation preventing structure of the vehicle head lamp according to the exemplary embodiment of the present invention is shown FIG. 5.

In the first step (S10), when the head lamp 2 becomes a lighting condition in which the moisture may be generated, the PCM unit 100 is driven to change a phase of the PCM from the liquid to the gas. In this case, the phase change is set using the lighting temperature (about 50° C.) of the head lamp 2.

In the second step (S20), which is a step of discharging the PCM, a low temperature and high density PCM is discharged, thereby making it possible to reduce absolute humidity and vapor partial pressure simultaneously with reducing an average temperature in the head lamp 2.

In the third step (S30), which is a step of suppressing the generation of the moisture, the dew point temperature drops by about 3 or 5° C. by the PCM discharged in the second step (S20) to prevent the generation of the moisture.

As set forth above, according to the exemplary embodiment of the present invention, the generation of the moisture in the lens of the head lamp is prevented, thereby making it possible to improve productivity of the vehicle and stability at the time of driving the vehicle, and the PCM unit is used, thereby making it possible to reduce a cost.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A moisture generation preventing apparatus of a vehicle head lamp, comprising:
    a phase change material (PCM) unit mounted in a housing of the vehicle head lamp having a lens mounted at a front end portion of the housing to prevent moisture from being generated in the lens when an internal temperature of the head lamp drops below a predetermined degree, wherein the PCM unit sprays gaseous phase change material (PCM) to an inner portion of the head lamp.

2. The moisture generation preventing apparatus of the vehicle head lamp of claim 1, wherein the PCM unit includes:
    a case including the PCM therein; and
    a valve unit selectively discharging the PCM from an inner portion of the case to the inner portion of the head lamp.

3. The moisture generation preventing apparatus of the vehicle head lamp of claim 2, wherein the case includes:
    a storing space having the PCM stored therein;
    an insertion groove, wherein the valve unit is mounted in the insertion groove; and
    a through-hole fluid-connected to the storing space.

4. The moisture generation preventing apparatus of the vehicle head lamp of claim 3, wherein the valve unit includes:
    a plate positioned on an upper surface of the through-hole in the insertion groove;
    an elastic member positioned on an upper surface of the plate and elastically biasing the plate toward the through-hole; and
    an engaging member positioned at an upper portion of the elastic member and engaged to the insertion groove of the case.

5. The moisture generation preventing apparatus of the vehicle head lamp of claim 4, wherein the engaging member includes a nozzle, the nozzle being selectively fluid-communicated to the through-hole in accordance with a movement of the plate.

6. The moisture generation preventing apparatus of the vehicle head lamp of claim 4, wherein the engaging member is a headless bolt.

7. The moisture generation preventing apparatus of the vehicle head lamp of claim 4, wherein the valve unit further includes a sponge positioned at an upper portion of the through-hole.

8. The moisture generation preventing apparatus of the vehicle head lamp of claim 3, wherein a lower portion of the case is provided with a connector to fill the PCM in the storing space of the case therethrough.

\* \* \* \* \*